US006564255B1

(12) United States Patent
Mobini et al.

(10) Patent No.: US 6,564,255 B1
(45) Date of Patent: May 13, 2003

(54) METHOD AND APPARATUS FOR ENABLING INTERNET ACCESS WITH DVD BITSTREAM CONTENT

(75) Inventors: Amir M. Mobini, Delray Beach, FL (US); Chris A. Dinallo, Boca Raton, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/113,592

(22) Filed: Jul. 10, 1998

(51) Int. Cl.[7] .............................................. G06F 15/16
(52) U.S. Cl. ....................... 709/219; 709/218; 709/217; 709/223; 709/229; 345/352; 345/353; 345/354
(58) Field of Search .................................. 709/200, 229, 709/219, 223, 225, 217; 380/4, 5, 9, 23, 20; 341/50; 345/354, 352, 353

(56) References Cited

U.S. PATENT DOCUMENTS

| | | | | |
|---|---|---|---|---|
| 5,818,935 A | * | 10/1998 | Maa ............................. 380/20 |
| 5,929,857 A | * | 7/1999 | Dinallo et al. ............... 345/354 |
| 5,991,399 A | * | 11/1999 | Graunke et al. ............... 380/4 |
| 6,035,329 A | * | 3/2000 | Mages et al. ............... 709/217 |
| 6,199,113 B1 | * | 3/2001 | Alegre et al. ............... 709/229 |
| 6,211,800 B1 | * | 4/2001 | Yanagihara et al. ........... 341/50 |
| 6,338,096 B1 | * | 1/2002 | Ukelson ..................... 709/246 |

* cited by examiner

Primary Examiner—Ayaz Sheikh
Assistant Examiner—Thu Ha Nguyen
(74) Attorney, Agent, or Firm—Kudirka & Jobse, LLP (57) ABSTRACT

An interactive DVD browser in accordance with the DVD specification for read-only discs is capable of accessing remotely located data over the Internet through a technique which contemplates new navigation commands as well as the embedding of HTML page addresses in navigation commands in place of data stream identifiers currently unused by the DVD specification. A navigation command is supplied to the interactive DVD browser indicating the browser should change data sources. The navigation command includes a network protocol address, in the form of HTML page address, as well as a local address of the user's default Internet browser. A second command specifies a predetermined period of time in which the browser should wait until the Internet browser establishes a hyperlink to the remote source of presentation data specified by the network page address. If the data resident at the specified address is suitable for presentation by the DVD browser, the data is presented, otherwise, the DVD browser will wait while the network browser presents non-DVD compliant data. The technique enables software updates, on-line registration and other dynamic data activities to occur with a legacy DVD browser while still complying with the DVD specification for read-only disc.

20 Claims, 6 Drawing Sheets

METHOD AND APPARATUS FOR ENABLING INTERNET ACCESS WITH DVD BITSTREAM CONTENT

FIELD OF THE INVENTION

This invention relates generally to improvements in digital versatile disc systems and, more particularly, to a technique for enabling a DVD player to access remote data.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies which use single or double sided capacities that hold approximately 8.5 gigabytes per side are available. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams which have sample rates between 48–96 kHz and are sampled at 16 or 24 bits. Still other DVD versions, hereinafter called DVD-ROM discs, can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

The specific navigational commands which are recognized by a DVD player are controlled by a device independent language and a set of DVD player parameters which define the current state of the DVD player. The DVD command set, including the aforementioned commands and their definitions, are published in the DVD specification. A copy of the *DVD 1.0 Specification for Read-Only Disc Vol. 3*, including a more detailed description of all DVD commands, may be obtained, for example, from Toshiba Corp., 1-1 Shibaura 1-Chome, Minato-ku, Tokyo 105-01 Japan.

The DVD specification proposes the use of ISO/IEC 13818 to combine different types of presentation data and navigation information. DVD data is arranged in packs, each consisting of at least one packet, on DVD discs. A stream identifier located within each pack header operates in conjunction with substream identifiers located within each packet to indicate the type of data contained within each packet. The DVD specification sets aside stream IDs and substream IDs for MPEG 1 audio and video packets and for MPEG 2 audio and video packets. Additionally, a private_stream_1 stream ID is used in conjunction with a set of substream IDs to identify packets that contain presentation data other than MPEG 1 or MPEG 2 audio or video data. For example, the private_stream_1 stream ID is used in conjunction with a 1010 0*** (binary) substream ID to identify linear pulse code modulated audio presentation data. Similarly, a private_stream_2 stream identifier may be combined with a set of substream identifiers to identify packets that contain navigation data.

Although the DVD specification accommodates different types of data, it only provides for the use of one source of data: the DVD disc itself. Consequently, the amount of information presentable to the user is limited to the capacity of the disc. Additionally, any updates to the presentation content or changes to the navigation structure of the content must be supplied by a new set of media. Although, instance software updates, additions to data, advertising, and on-line registration, etc. may be distributed electronically over private and public computer networks, such as the Internet, conventional DVD players cannot take advantage of such distribution channels. Consequently, a conventional DVD playback system whose navigational and presentation abilities are restricted to the immediate medium, e.g., to a DVD disc, is of limited use.

Accordingly, a need exists for a technique by which DVD, CD and other media players, which have been designed according to legacy specifications can access presentation data, software updates and other information over computer networks, such as the Internet, while still complying with the specifications to which they were designed.

SUMMARY OF THE INVENTION

The present invention provides a technique in which the DVD bitstream content enables a DVD playback system to access the Internet, or other computer networks or data sources, while still complying with the DVD specification. Specifically, the present invention contemplates the use of new navigation commands which enable a DVD browser to switch among various sources of presentation and navigation data, such as DVD discs, Internet web pages, and satellite feeds. The invention further contemplates the provision of access to the various sources of presentation and navigation data through the use of "unused" program substream identifiers set forth within the DVD specification. By employing the "unused" identifiers, the invention permits a DVD playback system constructed in accordance with the principles of the invention to maintain compatibility with legacy DVD systems and, at the same time, to provide access to a multitude of additional sources of presentation and navigation data. In another area of compatibility with legacy systems, the invention operates with browsers, such as internet browsers, to service presentation and navigation data originating from non-DVD compatible sources.

According to one aspect of the present invention, in an illustrative embodiment an interactive DVD browser includes DVD presentation and navigation engines which respectively operate upon presentation and navigation data. The navigation and presentation engines may obtain data, for example, from a bitstream provided by a DVD player. Data within the bitstream may be any one of several types of data, including MPEG-1 audio or video data, MPEG-2 audio or video data, Linear Pulse Code Modulated data, etc. Whatever type of data is involved, the data is arranged within packs in compliance with the DVD specification. Unused private_stream_1 and private_stream_2 substream identifiers are employed by the invention to allow an interactive DVD browser to change the source from which it is receiving navigation and presentation data, respectively. That is, the invention employs substream IDs undefined by the DVD specification, IDs that might otherwise be used to indicate that a different type of data is contained within the pack, to switch to another data source.

The interactive DVD browser (IDB) operates on predefined DVD data in a conventional manner. When the IDB encounters a user-defined DVD packet, one which the DVD spec permits a user to define, the interactive DVD browser, which contains the presentation and navigation engines, switches to a different source, a source that may be identified by the encoding of network addresses, such as Hypertext Markup Languages (HTML) addresses, within DVD packs that include the newly-defined substream identifiers.

This new source could be a DVD compliant source, e.g., a web site could emulate a DVD player, for example, to expand the content of a DVD disc. In such a case, the interactive DVD browser routes the presentation and navigation data from the new source to the IDB's DVD presentation and navigation engines. If the new source does not have DVD compliant presentation and navigation data, the interactive browser switches navigation and presentation data from the non-DVD source to non-DVD presentation and navigation engines, engines which may be contained within an internet browser, for example. A user interface routes decoded data from one or more of the presentation engines to a user output. The user interface also routes commands from a user to one of the navigation engines.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
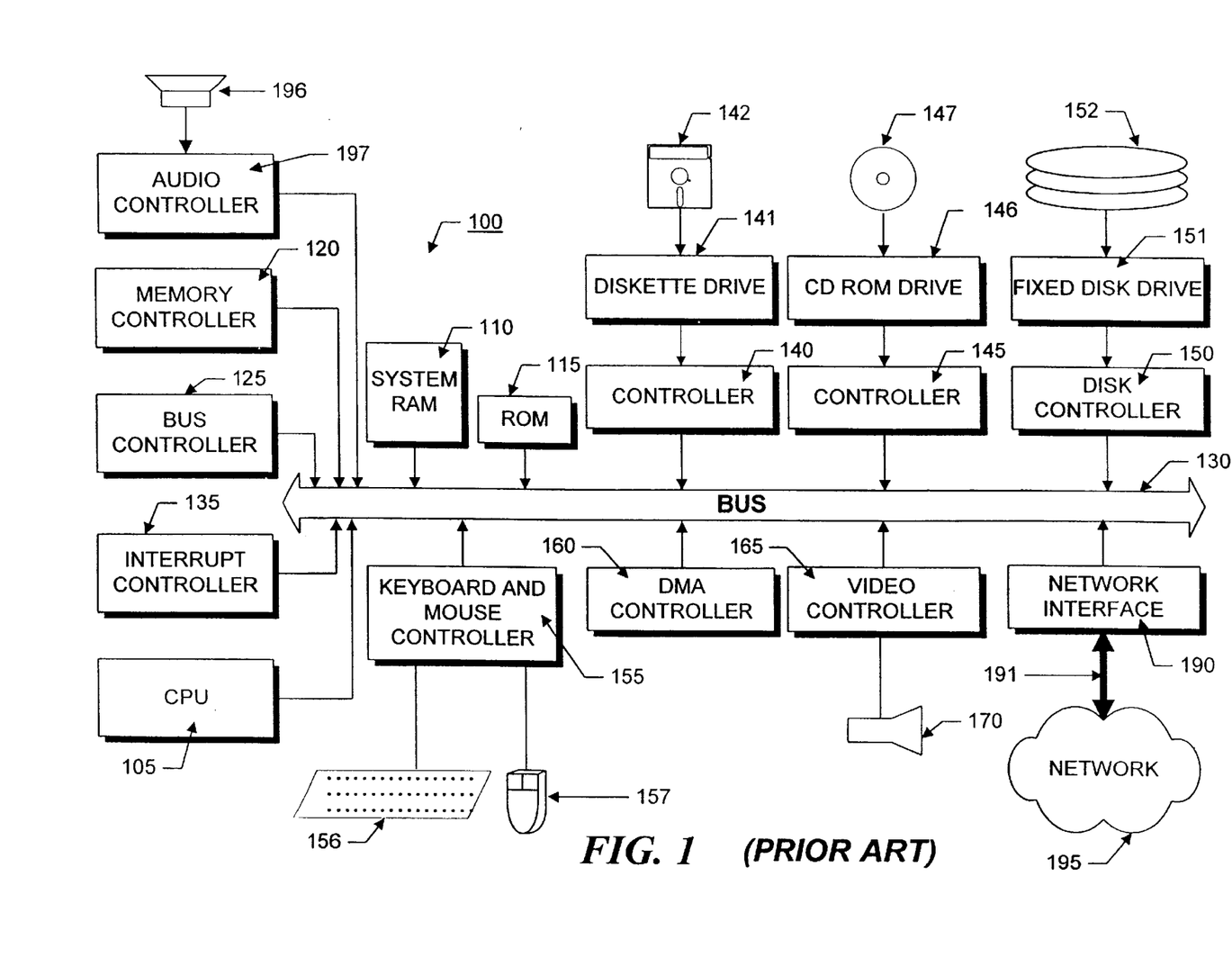
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 105. If the operating system is a true multitasking operating system, such as OS/2, multiple applications may execute simultaneously.

Figure 2:
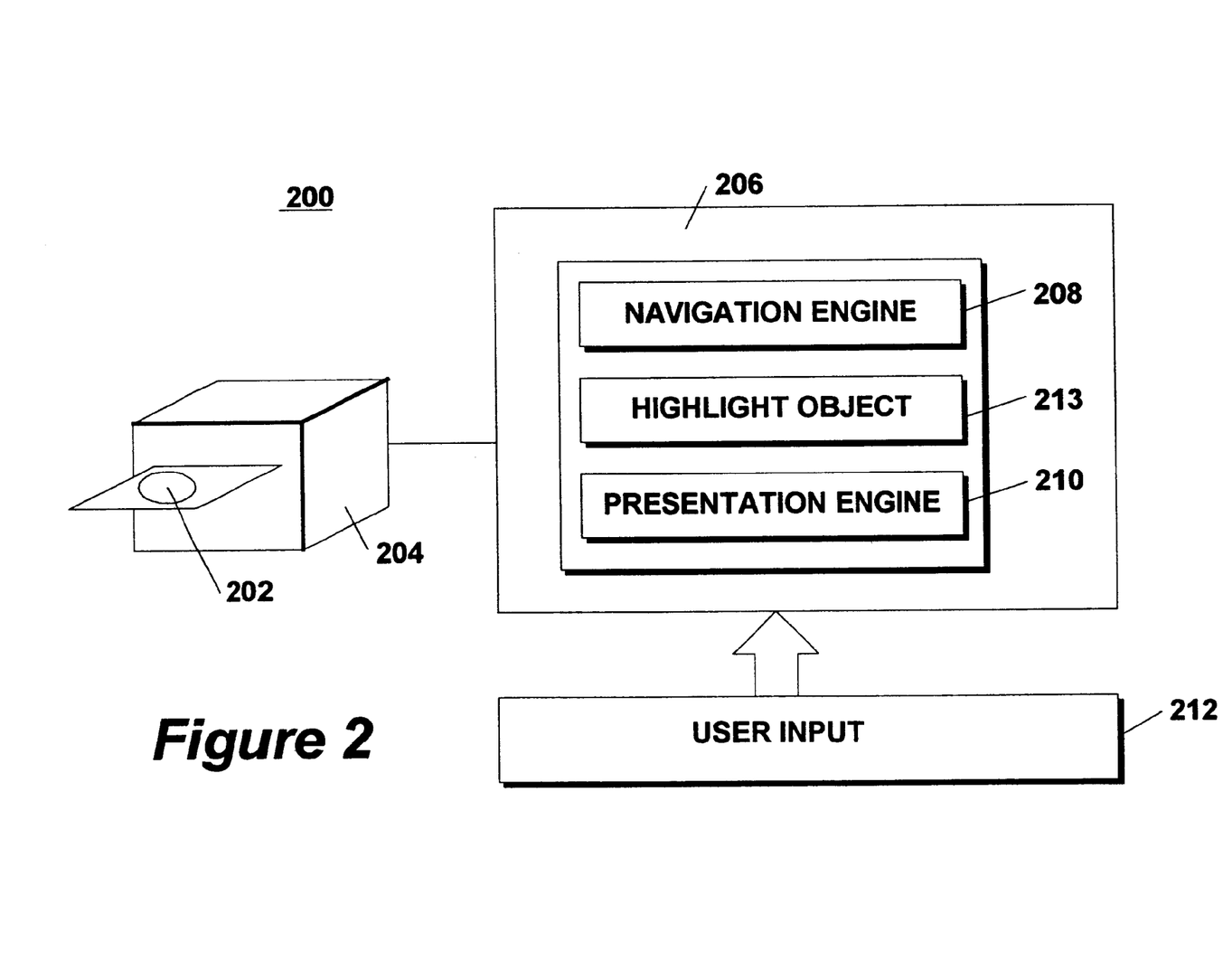
FIG. 2 is a conceptual diagram of the elements comprising an Interactive DVD Browser suitable for use with the present invention.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information which has been coded in accordance with the *DVD 1.0 Specification for Read-Only Disc* and disc 202 may contain up to seventeen gigabytes of information. The computer 206 includes a driver, not shown, for enabling the operating system in the computer 206 to control and exchange information with the drive 204. Computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" compression. Video information may be compressed using a compression technique known as Moving Picture Experts Group-2 (MPEG-2).

In an illustrative embodiment, the software elements of system 200 may be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Internet Access Pack

The current DVD specification for read-only discs proposes the use of ISO/IEC 13818 specification as a method for combining different types of presentation data and navigation information. The ISO/IEC 13818 specification provides a specific set of data stream identifiers (IDS) for representing audio and video packets in accordance with the MPEG1 and MPEG2 standard, as well as two private stream identifiers. The DVD specification for read-only discs specifies utilization of a first of the stream identifiers, i.e., private_stream_1 stream ID with a set of substream IDs to represent presentation data packets of MPEG1 and MPEG2 audio and video data. The specification specifies utilization of the second stream identifier, i.e. private_stream_2 stream ID With a set of substreams IDs to represent navigation information. Two private stream IDs defined within the ISO/IEC 13818 specification are utilized in accordance within the present invention for accessing source of information other than a DVD disc, e.g., for introducing packets of Internet access information.

Figure 3:
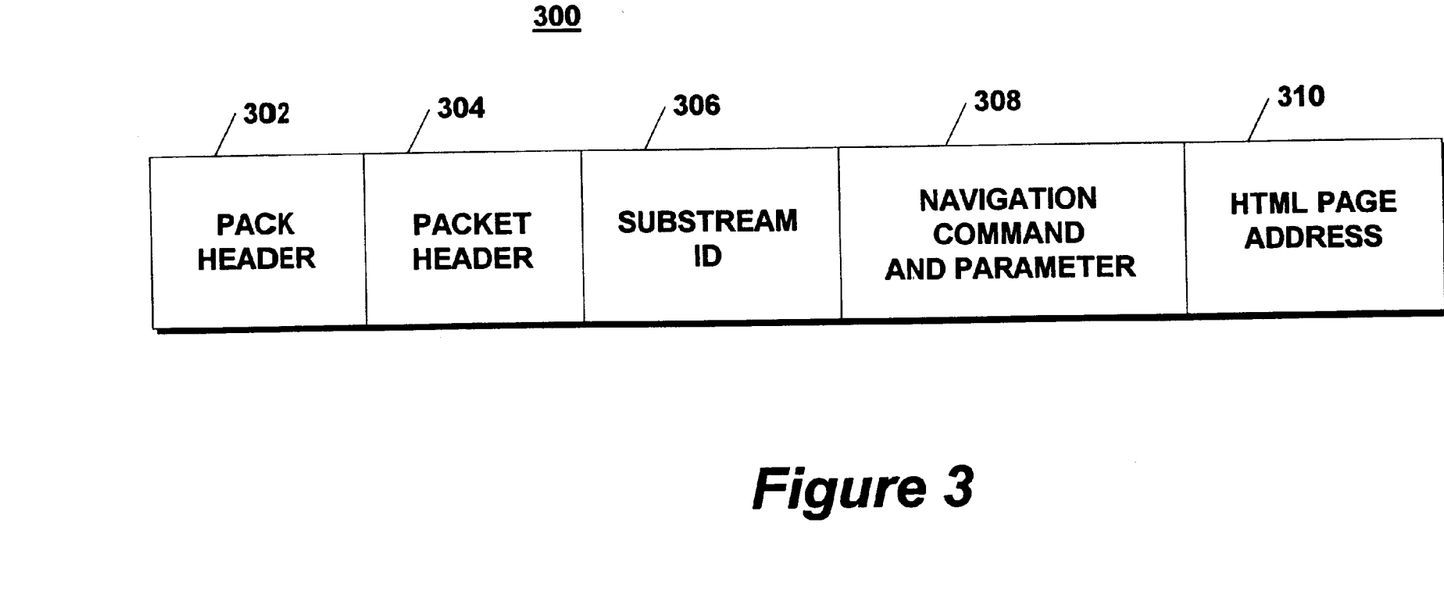
FIG. 3 is a diagram of a network access packet in accordance with the present invention.

Referring to FIG. 3, an Internet access pack 300 is shown comprising the pack header 302, packet header 304, sub stream_ID 306, navigation command and parameter 308, and a HTML page address 310. In the illustrative embodiment, packet header 302 may be implemented with 14 bytes of digital information. Packet header 304 may be implemented with either 9 or 14 bytes of digital information while substream_ID 306 may be implemented with as little as a single byte. Navigation command and parameter 308 may be implemented with 8 bytes of information and may have a form and content as described hereinafter. The HTML page address 310 may comprise from 4 to 2,016 bytes of information and may have the form and content of a conventional HTML address as used by an Internet browser and understood by those reasonably skilled in the arts.

New Navigation Commands

The present invention contemplates the creation and use of two navigation commands associated with the presentation engine layer of the interactive DVD browser and one navigation command associated with the navigation engine layer of the interactive DVD browser, as set forth below:

Change Source (New Source)

Wait (Time to Wait)

The Change Source command is a navigation command which directs the interactive DVD browser to accept data from a new source, as indicated by the New Source parameter. In the illustrative embodiment, the new source indicated by the parameter would be the local internet browser located on the user system. Internet browsers suitable for use with the present invention are NetScape Navigator, commercially available from NetScape Communications Corporation, Santa Clara, Calif. or Internet Explorer, available from MicroSoft Corporation, Redmond, Wash.

The second new navigation command, the wait command directs the interactive DVD browser to wait for a specific amount of time. In the illustrative embodiment, the amount of time to wait can be expressed in seconds or fractions thereof, e.g. milliseconds. When the interactive DVD browser receives a specific navigation command in the Internet Access Packet, as described above indicating the presence of a HTML page address, the interactive DVD browser passes the HTML address to the user's Internet browser on the same system. Once a hyperlink is connected with the remote site specified by the HTML address, the presentation data residing at the remote site can be presented to the user in one of two possible methods depending on the navigation command.

If the hyperlinked data contains DVD compliant presentation data, the interactive DVD browser may accept the data from the Internet browser accordingly. Once the data has been presented, the Interactive DVD browser may use the change source command to change sources back to the DVD disc currently associated with the platform. Alternatively, if the hyperlink data from the remote source contains non-DVD compliant data, the Interactive DVD Browser waits for the duration specified in the wait command parameter while the Internet browser displays the data using the command. The present invention provides a means for accessing HTML page addresses stored in a DVD bitstream. The HTML pages identified by the addresses within the Internet Access Packets may be linked to other types of presentation data which may be interpreted by either the DVD browser or local HTML browser and its associated media players. In the illustrative embodiment, the presentation layer data is encoded into the Internet Access Packets with the private stream 1 stream ID, as previously described, and a tentative substream ID of 1111 1000. It will be obvious to those skilled in the art that the specific address used within the substream may vary according to the discretion of the designer. The navigation layer data is encoded into the Internet Access Packets with private stream 2 stream ID and a tentative stream ID of 1111 1000. When the Interactive DVD browser changes sources to the local Internet HTML browser, the Interactive DVD browser treats the Internet Access Pack as a navigation pack (NV_PACK) as described by the DVD specification for read-only discs.

Figure 4:
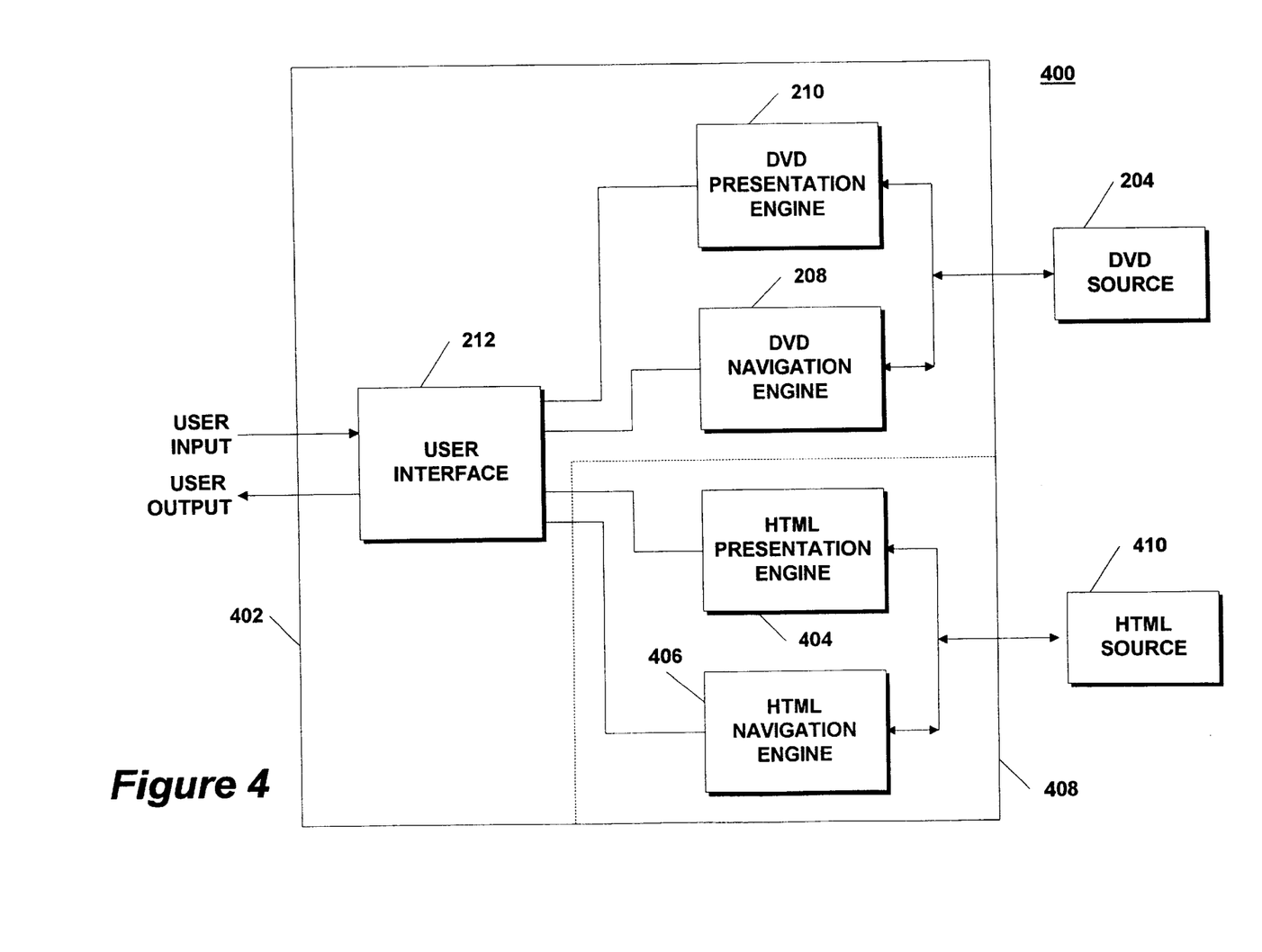
FIG. 4 is a flow chart which illustrates the process of creating the network access packet of FIG. 3 in accordance with the principles of the present invention.

The block diagram of FIG. 4 provides a functional level overview of an illustrative embodiment of an interactive DVD playback system 400 in accordance with the principles of the present invention. The user interface 212, DVD presentation engine 210, DVD navigation engine 208, and DVD source 204 are as previously described. The presentation engine 210, navigation engine 208 and user interface 212 together comprise interactive DVD browser 402. In HTML presentation engine 404 and HTML navigation engine 406 are included within a conventional HTML browser 408, such as an Internet browser.

The conventional browser 408 exchanges navigation in presentation data with an HTML source which, illustratively, may be the Internet, a satellite feed, or other data source. Illustratively, the interactive DVD browser 402 and HTML 408 are respectively associated with DVD and HTML compliant data at system initialization. Consequently, the HTML browser 408 routes non DVD compliant presentation and navigation data to its own presentation in navigation engines 404 and 406, respectively, whenever it receives such data from the HTML source 410. Conversely, whenever the HTML browser 408 encounters DVD compliant navigation or presentation data, the HTML browser passes the DVD compliant data to the interactive DVD browser 402 for execution by presentation and navigation engine 210 and 208. The user interface 212 provides for user input, such as navigation commands, for example, and may present, e.g., display, provide sound, etc. data from either the DVD presentation engine 210 or the HTML presentation engine 404. The user interface 212 may also present data from the presentation engine 210 and 404 simultaneously, with the data from one engine displayed within a window, for example.

As previously described, the source data being presented may be switched in a variety of ways. A "navigation" command, change source, embedded within the DVD bitstream may include an HTML address which specifies an HTML address which, in the illustrative embodiment, provides DVD compliant data. Consequently, the data, although obtained through the HTML browser 408, is sent to the interactive DVD browser 402 for execution by the DVD presentation and navigation engines 210 and 208, respectively.

Additionally, the source of data may be switched from the DVD source 204 to another source by embedding commands within the DVD bitstream for the DVD presentation engine 210. In such a case, the DVD presentation engine 210 may display a change source command to a user through the user interface 212, permitting the user to form a hyperlink to another source. Change source commands handled by the DVD presentation engine 210 may be "bare" command, in that they simply provide an address for a new source of DVD compliant data, which will be routed to the DVD presentation and navigation engines 210 and 208. Alternatively, the presentation engine 210 may encounter within the DVD bitstream a change source command that is accompanied by a wait command. The combination of change source and wait commands permit the DVD system 400 to present non DVD compliant data from a source such as the HTML source 401. In the case of non DVD compliant data sources, the change source command is accompanied by a wait command which specifies a period of time for the interactive DVD browser to wait in order to permit the HTML browser 408 to present data which is non DVD compliant. Although the data may be MPEG1 audio or video or MPEG2 audio or video data or linear code modulation data, or any of a variety of data types which may be found on a DVD disc, it is not formatted in accordance with the DVD specification. That is, the data may, for example, not include a pack header 302. After establishing the hyperlink to display non DVD data, the HTML browser 408 may acquire additional time to process the non DVD data. In such a case, the HTML browser may send a wait command to the interactive DVD browser so that the HTML browser will have sufficient time to complete its presentation of the non DVD compliant data.

Figure 5:
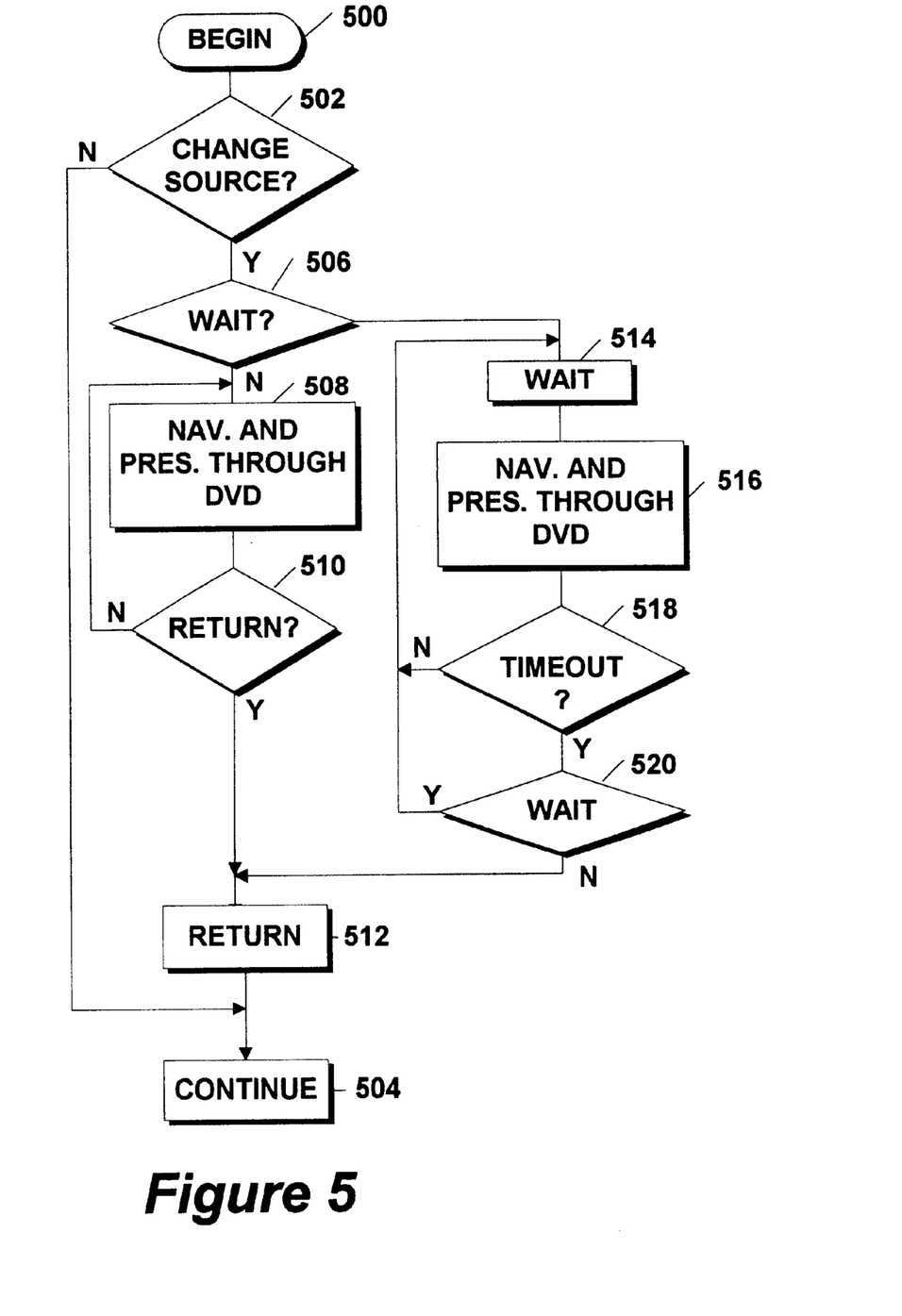
FIG. 5 is a flow chart which illustrates the method of accessing remote data using a network access packet embedded within presentation data and an Interactive DVD Browser in accordance with the principles of the present invention.

The process of using a presentation engine command to change a data source is illustrated in the flow chart of FIG. 5. The process begins in step 500 and proceeds from there to step 502 where the presentation engine examines the DVD bitstream to determine whether the next command is a change source command. If the next command in the bitstream is not a change source command, the process proceeds to 504 where the interactive DVD browser continues operation by, for example, presenting presentation data. Conversely, if the next data pack within the DVD bitstream contains a change source command, the process proceeds from step 502 to step 506 where the following pack is examined to determine whether it contains a wait command. If the following command is not a wait command, the new source provides DVD compliant data. Consequently, the process proceeds to step 508 with a navigation and presentation data provided by the new source, e.g., HTML source 401, are passed to and processed by the DVD navigation and presentation engines 210 and 208. From step 508 the process proceeds to step 510 where it is determined whether the source of data will be switched back to the DVD source. This return to the DVD source may be affected in any number of ways, such as a change source command issued by the new data source, a timeout, or other methods known in the art.

If the interactive DVD browser is to return to the DVD source 204 for navigation and presentation data, the process proceeds to step 512 where the interactive DVD browser returns to the DVD source 204 for presentation in navigation data. From step 512, the process proceeds to step 504 and from there as previously described.

If, in step 506, it is determined that the change source command was accompanied by a wait command, the process proceeds to step 514 where the interactive DVD browser 402 waits for the prescribed period of time. While the interactive DVD browser is waiting, navigation and presentation data are routed to the HTML navigation and presentation engines 406 and 404 in step 516. The process proceeds to step 518 where the interactive DVD browser determines whether the wait period set forth in the initial wait command has expired. If the period has not expired, the process returns to step 514 and continues to loop in this fashion until the time period has expired. After the wait period has expired, that is, when in step 518 it is determined that the wait period is over, the process proceeds to step 520 where it is determined whether another wait command has been encountered. A second wait command, generated by the HTML data source 1410 for example, may be used to extend the period of time available for the HTML browser 408 to present non DVD compliant data.

If there is another wait command, the process returns to step 154 and from there as previously described. If there is not another wait command, the process proceeds from step 520 to step 512, and from there as previously described.

Figure 6:
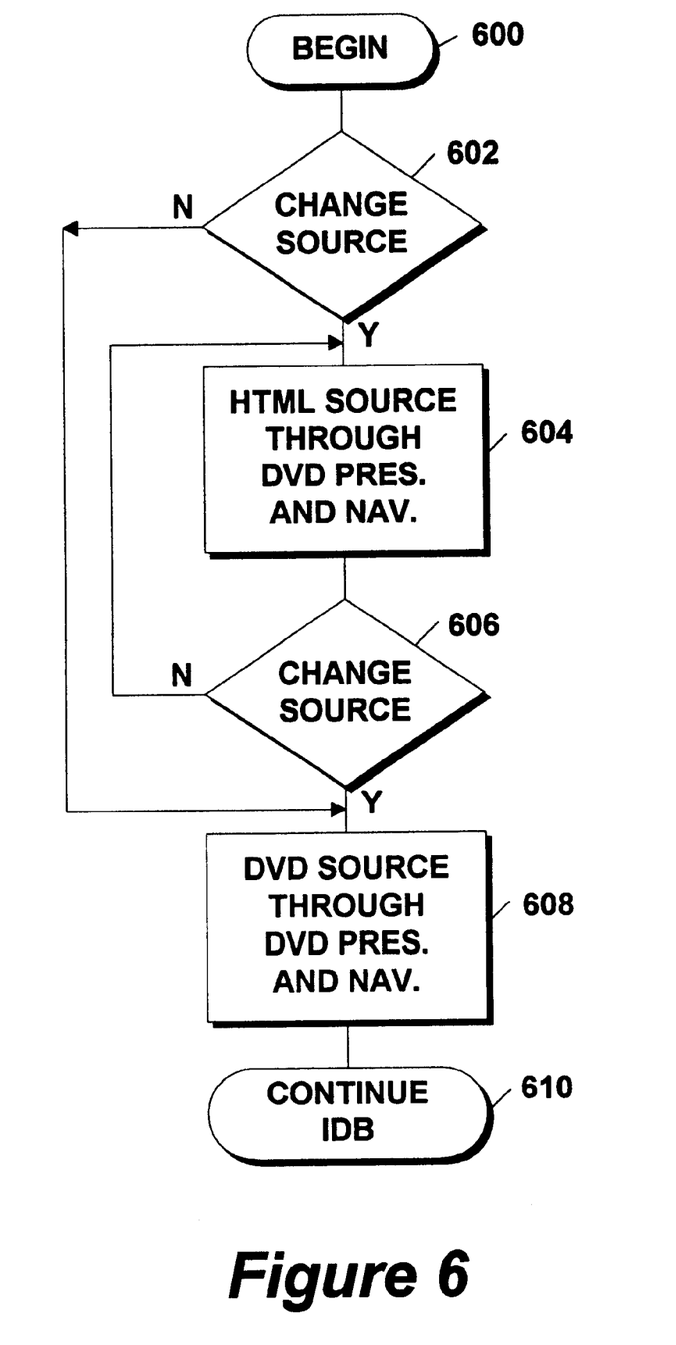
FIG. 6 is a flow chart which illustrates the method of accessing remote data using using a network access packet embedded within navigation data and an Interactive DVD Browser in accordance with the principles of the present invention.

The process of executing a change source command embedded within the navigation portion of a DVD bitstream is set forth in the flow chart of FIG. 6. The process begins in step 600 and proceeds from there to step 602, where the bitstream is examined for a change source command. When a change source command is uncovered, the process proceeds to step 604 where the source of data is changed from the DVD source 204 to the HTML source 410. In the illustrative embodiment, the navigation layer change source command supports a change of data source only to a source which provides DVD compliant data. Consequently, no wait command is required and once the link is established to the HTML source 410, DVD compliant data is transferred from the HTML browser 408 to the interactive DVD browser 402 for execution by the DVD presentation and navigation engines 210 and 208.

Operation continues from the non DVD source, e.g., HTML source 410 (which provides DVD compliant data) until, in step 606, it is determined that the interactive DVD browser is to convert to receiving data from the DVD source 204. In such a case, the process proceeds from step 606 to step 608, where the interactive DVD browser commences receiving data from the DVD data source and routes it through the DVD presentation and navigation engines 210 and 208. Otherwise, the process returns to step 604 where the DVD compliant data from the HTML source continues to be executed by the DVD presentation and navigation engines 210 and 208. After reconnecting to the DVD source, the process proceeds from step 608 to step 610 where the interactive DVD browser activity continues.

The illustrative embodiment of the present invention has been described with reference to an interactive DVD browser written in accordance with the DVD specification for read-only discs. Similar concepts, however, may be applied to the current specification for CD ROM players and other media players having legacy design which adhere to published standards of specification. Using the concepts disclosed herein of introducing new navigation commands, as well as embedding HTML addresses within unused portions of either the navigation or presentation packets, such other types of media players may be able to similarly access presentation data from new sources, particularly those located at HTML page addresses.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. In a first browser application capable of receiving both presentation data and navigation data from an associated local medium, said browser capable of interacting with a second browser application associated with a different medium, a method for accessing navigation and presentation data from a new source other than a local medium, the presentation data presentable to a user of the system on which the first browser application is executing, if in a compatible format, the method comprising:

(a) receiving a command to change to a new source of data, the command comprising an address which the second browser recognizes as the address of the new source; and (b) supplying the address of the new source to the second browser.

2. The method of claim 1 wherein the second browser is an internet browser.

3. The method of claim 1 wherein the second browser is a satellite interface browser.

4. In a first browser application capable of receiving both presentation data and navigation data from an associated local medium, said browser capable of interacting with a second browser application associated with a different medium, a method for accessing navigation and presentation data from a new source other than a local medium comprising:

(a) receiving a command to change to a new source of data, the command comprising an address which the second browser recognizes as the address of the new source;

(b) supplying the address of the new source to the second browser; and (c) presenting data from the new source through the first browser if the data from the new source is in a format presentable by the first browser.

5. The method of claim 1 further comprising the steps of:

(d) waiting a specified period of time, and (e) presenting data through the second browser.

6. The method of claim 1 wherein the first browser is an interactive browser which complies with the digital versatile disc specification for read-only discs.

7. The method of claim 1 wherein the address of the new data source comprises a Hypertext Markup Languages (HTML) address.

8. The method of claim 1 wherein the command to change data sources further comprises the address of an application capable of establishing a connection with the new data source.

9. Apparatus for presenting presentation data from a plurality of sources comprising:

a first browser responsive to presentation and navigation data from a first source of data and to a command to receive data from a different source of data, said command comprising the address of a different source, and a second browser responsive to presentation and navigation data from a second data source, the first browser being responsive to reception of said command to change to a different source and capable of supplying the address of the new source of data to the second browser, the presentation data presentable to a user of the system on which the first browser application is executing, if in a compatible format.

10. Apparatus of claim 9 wherein the first browser is a DVD browser which includes DVD presentation and navigation engines.

11. Apparatus of claim 9 wherein the second browser is an Internet browser which includes HTML navigation and presentation engines.

12. Apparatus of claim 9 wherein the second browser is a satellite feed browser which includes satellite data presentation and navigation engines.

13. Apparatus for presenting presentation data from a plurality of sources comprising:

a first browser responsive to presentation and navigation data from a first source of data and to a command to receive data from a different source of data, said command comprising the address of a different source; and a second browser responsive to presentation and navigation data from a second data source;

the first browser being responsive to reception of said command to change to a different source and capable of supplying the address of the new source of data to the second browser, the second browser routing presentation data from the second source to the first browser for presentation by the first browser if the presentation data from the second source is in a format presentable by the first browser.

14. Apparatus of claim 13 wherein the activity of the first browser is paused so that presentation data may be presented through the second browser.

15. A computer program product for operation on presentation and navigation data stored on a medium, the computer program product comprising a computer usable medium having computer readable code thereon comprising:

DVD browser program code for retrieving and operating on navigation and presentation data from a DVD data source, at least some of the data instructing the DVD browser to change from the DVD data source to another data source, program code for interfacing between a DVD browser and a non-DVD browser, and program code responsive to said change data for switching from the DVD data source to another data source, the presentation data presentable to a user of the system DVD browser program code, if in a compatible format.

16. The computer program product of claim 15 wherein the non-DVD browser is an Internet browser.

17. A computer program product for operation on presentation and navigation data stored on a medium, the computer program product comprising a computer usable medium having computer readable code thereon comprising:

DVD browser program code for retrieving and operating on navigation and presentation data from a DVD data source, at least some of the data instructing the DVD browser to change from the DVD data source to another data source;

program code for interfacing between a DVD browser and a non-DVD browser; and program code responsive to said change data for switching from the DVD data source to another data source, the program code for interfacing between the DVD browser and non-DVD browser providing presentation data from the non-DVD browser to a user through the DVD browser if the presentation data from the non-DVD browser is in a format presentable by the DVD browser.

18. The computer program product of claim 15 including program code for pausing the activity of the DVD browser, and presenting presentation data through a non-DVD browser.

19. A computer program product for use with a DVD playback system, the computer program product comprising a computer usable medium having computer readable code thereon comprising:

DVD presentation and navigation data, the DVD presentation data presentable with the DVD playback system, if in a compatible format, program code for instructing the DVD playback system to switch to another medium containing presentation and navigation data, and program code identifying the source of the other medium.

20. The computer program product of claim 19 further comprising:

program code for instructing the DVD playback system to wait a predetermined period of time.

* * * * *